US009937802B2

(12) United States Patent
Luedtke et al.

(10) Patent No.: US 9,937,802 B2
(45) Date of Patent: Apr. 10, 2018

(54) SYSTEMS AND METHODS FOR DETERMINING A DUTY CYCLE FOR A VARIABLE VOLTAGE CONVERTER

(71) Applicant: Ford Global Technologies, LLC, Dearborn, MI (US)

(72) Inventors: Daniel Richard Luedtke, Beverly Hills, MI (US); Yulei Chen, Northville, MI (US); Kyle M. Hanson, Madison, WI (US); Fazal Urrahman Syed, Canton, MI (US); Wei Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 636 days.

(21) Appl. No.: 14/596,432

(22) Filed: Jan. 14, 2015

(65) Prior Publication Data

US 2016/0200201 A1    Jul. 14, 2016

(51) Int. Cl.
| | | |
|---|---|---|
| *B60L 11/02* | (2006.01) | |
| *B60L 11/18* | (2006.01) | |
| *B60L 7/14* | (2006.01) | |
| *B60L 11/12* | (2006.01) | |
| *B60L 11/14* | (2006.01) | |
| *B60L 15/00* | (2006.01) | |
| *B60L 15/20* | (2006.01) | |

(52) U.S. Cl.
CPC ............... *B60L 11/02* (2013.01); *B60L 7/14* (2013.01); *B60L 11/123* (2013.01); *B60L 11/14* (2013.01); *B60L 11/18* (2013.01); *B60L 11/1861* (2013.01); *B60L 15/007* (2013.01); *B60L 15/20* (2013.01); *B60L 15/2009* (2013.01); *B60L 15/2054* (2013.01); *B60L 2210/14* (2013.01); *B60L 2210/40* (2013.01); *B60L 2240/421* (2013.01); *B60L 2240/423* (2013.01); *B60L 2240/427* (2013.01); *B60L 2240/441* (2013.01); *B60L 2240/443* (2013.01); *B60L 2240/527* (2013.01); *B60L 2240/547* (2013.01); *B60L 2240/549* (2013.01); *Y02T 10/6217* (2013.01); *Y02T 10/645* (2013.01); *Y02T 10/705* (2013.01); *Y02T 10/7005* (2013.01); *Y02T 10/7044* (2013.01); *Y02T 10/7077* (2013.01); *Y02T 10/7225* (2013.01); *Y02T 10/7241* (2013.01); *Y02T 10/7275* (2013.01)

(58) Field of Classification Search
CPC .................................. B60L 11/02; B60L 11/18
See application file for complete search history.

(56) References Cited

U.S. PATENT DOCUMENTS

| | | | |
|---|---|---|---|
| 7,075,278 B2 | 7/2006 | Uematsu et al. | |
| 2007/0139027 A1 | 6/2007 | Nishimori | |
| 2008/0191751 A1* | 8/2008 | Oh ....................... | H03K 5/1565 327/114 |

(Continued)

*Primary Examiner* — Jeffrey Shin
(74) *Attorney, Agent, or Firm* — David Kelley; Brooks Kushman P.C.

(57) ABSTRACT

A vehicle includes a traction battery, an electric machine, and a variable voltage converter. The variable voltage converter includes an inductor and is disposed electrically between the traction battery and electric machine. The vehicle also includes a controller programmed to issue duty cycle commands for the variable voltage converter based on a product of an AC component of current flowing through the inductor and a calibrated resistance.

9 Claims, 5 Drawing Sheets

(56) References Cited

U.S. PATENT DOCUMENTS

| | | | |
|---|---|---|---|
| 2009/0033302 A1* | 2/2009 | Hariu | H02M 1/36 323/283 |
| 2012/0105078 A1* | 5/2012 | Kikuchi | H02M 3/156 324/654 |
| 2012/0221183 A1* | 8/2012 | Wu | B60L 15/20 701/22 |
| 2012/0242300 A1 | 9/2012 | Ueno et al. | |

* cited by examiner

US 9,937,802 B2

SYSTEMS AND METHODS FOR DETERMINING A DUTY CYCLE FOR A VARIABLE VOLTAGE CONVERTER

TECHNICAL FIELD

The present disclosure relates to systems and methods for determining a duty cycle for a variable voltage converter based on measured inductor current.

BACKGROUND

The term "electric vehicle" can be used to describe vehicles having an electric motor for vehicle propulsion, such as battery electric vehicles (BEV), hybrid electric vehicles (HEV), and plug-in hybrid electric vehicles (PHEV). A BEV includes an electric motor, wherein the energy source for the motor is a battery that is re-chargeable from an external electric grid. In a BEV, the battery is the source of energy for vehicle propulsion. An HEV includes an internal combustion engine and one or more electric motors, wherein the energy source for the engine is fuel and the energy source for the motor is a battery. In an HEV, the engine is the main source of energy for vehicle propulsion with the battery providing supplemental energy for vehicle propulsion (the battery buffers fuel energy and recovers kinetic energy in electric form). A PHEV is like an HEV, but the PHEV has a larger capacity battery that is rechargeable from the external electric grid. In a PHEV, the battery is the main source of energy for vehicle propulsion until the battery depletes to a low energy level, at which time the PHEV operates like an HEV for vehicle propulsion.

Electric vehicles may include a direct current (DC) voltage converter, e.g., variable voltage converter (VVC), connected between the battery and the electric motor. Such a voltage converter increases or boosts the voltage potential of the electrical power provided to the electric motor and facilitates torque capability optimization. The electric vehicle may also include an inverter connected between the DC voltage converter and the motor, when the motor is configured as an alternating current (AC) motor.

SUMMARY

A vehicle power system has a variable voltage converter (VVC) including an inductor, and at least one controller. The at least one controller, in response to a request to alter a duty cycle of the VVC, outputs a duty cycle command for the VVC based on an AC component of current flowing through the inductor, a calibrated gain having units of resistance, and an output voltage command for the VVC.

A vehicle includes a traction battery, an electric machine, and a variable voltage converter (VVC). The VVC includes an inductor and is disposed electrically between the traction battery and electric machine. The vehicle also includes a controller that issues duty cycle commands for the VVC based on a product of an AC component of current flowing through the inductor and a calibrated resistance.

A method for controlling a vehicle power system includes, in response to a request to alter a duty cycle of a variable voltage converter (VVC), outputting a duty cycle command for the VVC that is based on an AC component of current flowing through an inductor of the VVC, a calibrated resistance, and an output voltage command for the VVC.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
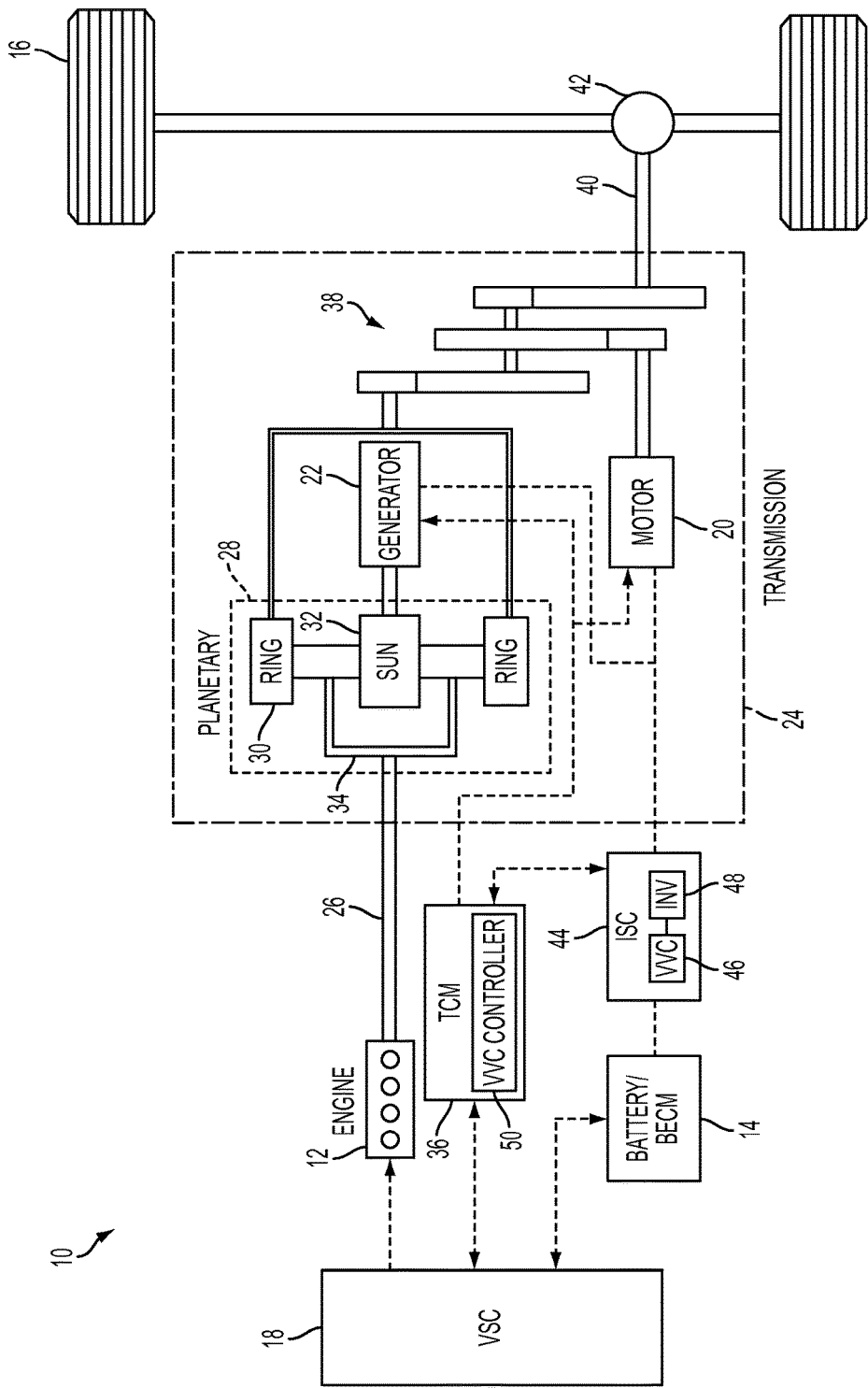
FIG. 1 is a schematic diagram illustrating a hybrid powertrain system.

Referring to FIG. 1, a hybrid electric vehicle (HEV) includes a powersplit powertrain 10 in which either or both of an internal combustion engine 12 and a high voltage battery, or electric traction battery 14, power wheels 16 of the vehicle. A vehicle system controller (VSC) 18 controls operation of the engine 12 and the battery 14. The battery 14 has a two-way electrical connection, whereby it receives and stores electric energy (e.g., via regenerative braking) and also supplies the energy to an electric traction motor/generator 20, or "electric motor," and a generator 22. The VSC 18 is in communication with a transmission control module (TCM) 36 that controls operation of the electric motor 20 and the generator 22. Both the engine 12 and the electric motor 20 are capable of powering a transmission 24 that ultimately delivers torque to the wheels 16 of the vehicle.

The battery 14 can include its own designated battery energy control module (BECM) (shown generally as part of battery 14) electrically connected thereto for controlling the operation of the battery 14. Alternatively, the VSC 18 can directly control the operation of the battery 14. Other power control modules can exist. It should be understood that throughout this disclosure, the VSC 18, the BECM, the TCM 36 and other control modules that control the power flow throughout the powertrain 10 can be collectively referred to as "controllers" and generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 18 communicates with other vehicle systems and controllers (e.g., the BECM and the TCM 36) over one or more hardline vehicle connections using common bus protocols (e.g., CAN and LIN).

In the powersplit powertrain 10, the engine 12 delivers power to a torque input shaft 26 that is connected to a planetary gear set 28 through a one-way clutch (not shown). The planetary gear set 28 includes a ring gear 30, a sun gear 32, and a planetary carrier assembly 34. The input shaft 26 is driveably connected to the carrier assembly 34 to power the planetary gear set 28. The sun gear 32 is driveably connected to the generator 22. The generator 22 may be selectively engaged with the sun gear 32 via a clutch (not shown) such that the generator 22 may either rotate with the sun gear 32, or not rotate with it. When the one-way clutch couples the engine 12 to the planetary gear set 28, the generator 22 generates energy as a result of the operation of the planetary gear set 28. Electric energy generated from the generator 22 is transferred to the battery 14 through electrical connections and a high voltage bus. The battery 14 also receives and stores electric energy through regenerative braking in a manner well known to one skilled in the art. The battery 14 supplies the stored electric energy to the electric motor 20 for operation. The portion of the power delivered from the engine 12 to the generator 22 may also be transferred directly to the electric motor 20. The battery 14, electric motor 20, and generator 22 are each interconnected via a two-way electric flow path through electrical connections.

The vehicle may be powered by the engine 12 alone, by the battery 14 and electric motor 20 alone, or by a combination of the engine 12 with the battery 14 and electric motor 20. In a first mode of operation ("hybrid mode of operation," "hybrid propulsion mode," etc.) the engine 12 is activated to deliver torque through the planetary gear set 28. The ring gear 30 distributes torque to step ratio gears 38 comprising multiple meshing gear elements. Torque is distributed from the ring gear 30, through the gears 38 and to a torque output shaft 40. In the first mode of operation, the electric motor 20 may also be activated to assist the engine 12 in propelling the vehicle by transferring torque through the gears 38 to the torque output shaft 40.

In a second mode of operation ("electric-only propulsion mode," "EV mode," etc.), the engine 12 is disabled or otherwise prevented from distributing torque to the output shaft 40. And, the battery 14 powers the electric motor 20 to distribute torque through the step ratio gears 38 and to the torque output shaft 40.

In either or both of the first mode of operation and the second mode of operation, the VSC 18 and the TCM 36 control the engine 12, the battery 14, the electric motor 20, and the generator 22 in a manner described above in order to distribute torque to the torque output shaft 40. The torque output shaft 40 is connected to a differential and axle mechanism 42 which distributes torque to power the wheels 16.

It should be understood that either or both of the electric motor 20 and generator 22 can each generate electric power or provide propulsion power in methods described above. Both of the electric motor 20 and the generator 22 can interchangeably be referred to as either a motor or a generator, or broadly as an electric machine.

While FIG. 1 illustrates an embodiment in which the powertrain 10 is a powersplit powertrain, for purposes of the present disclosure the powertrain 10 may be any hybrid powertrain configuration. For example, the powertrain may be configured such that an output of an engine and an input of a motor/generator are selectively engaged via a clutch. Either or both of the engine and motor/generator can provide torque to a transmission along one rotatable shaft. The present disclosure can also be applied to start-stop systems in hybrid or non-hybrid vehicles in which the engine automatically stops and restarts to reduce the amount of idling time. Other hybrid powertrain and transmission configurations exist, and the powersplit configuration of FIG. 1 is but one example.

Further with reference to FIG. 1, the powertrain 10 includes an inverter system control (ISC) 44 including a variable voltage converter (VVC) 46 and an inverter 48. The VVC 46 and the inverter 48 are electrically connected between the battery 14 and the motor 20, and the generator 22. The VVC 46 boosts or "steps up" the voltage potential of the electrical power provided by the battery 14. The inverter 48 inverts the DC power supplied by the battery 14 (through the VVC 46) to AC power for operating the motor 20 and the generator 22. The inverter 48 also rectifies AC power provided by the motor 20 and the generator 22, when acting as a generator, to DC power for charging the battery 14.

The TCM 36 includes a VVC controller 50 that monitors electrical parameters (e.g., voltage and current) at various locations within the VVC 46. The TCM 36 provides an output voltage command $V^*_{dc}$ input signal to the VVC controller 50. The VVC controller 50 determines based on the electrical parameters and the voltage command $V^*_{dc}$ a duty cycle sufficient to achieve the desired output voltage, i.e., a duty cycle command D*. The VVC controller 50 then commands the VVC 46 to provide the desired output voltage at the determined duty cycle. The particular duty cycle at which the VVC 46 is operated is directly related to the amount of voltage boost the VVC 46 provides. The ideal relationship between the input voltage $V_{in}$ and the output voltage $V_{out}$ and the duty cycle D is illustrated using the following equation:

$$V_{out} = \frac{V_{in}}{(1-D)} \quad (1)$$

Figure 2:
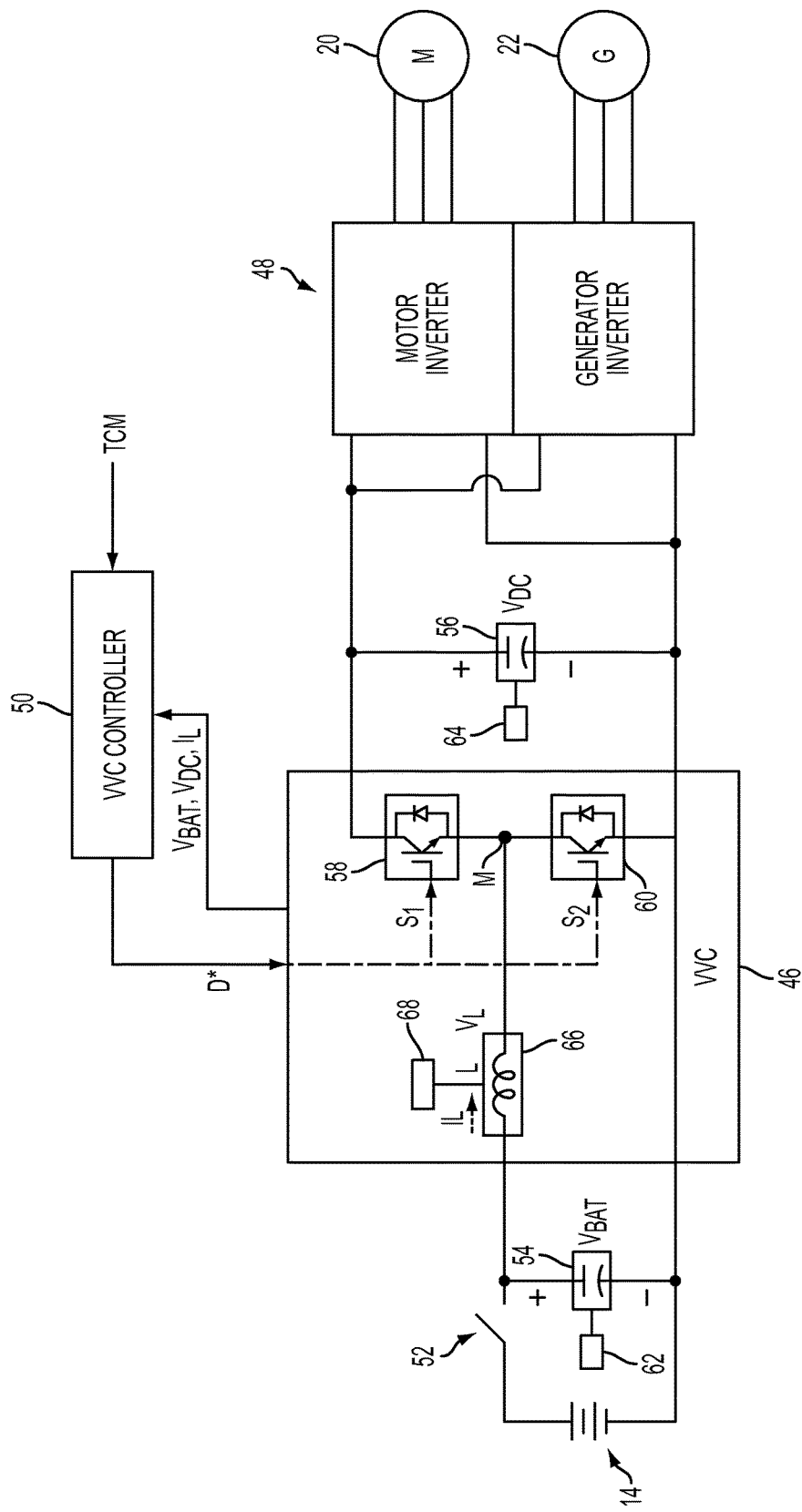
FIG. 2 is a schematic diagram illustrating a hybrid vehicle voltage conversion system.

With reference to FIG. 2, the VVC 46 boosts or "steps up" the voltage potential of the electrical power provided by the battery 14. The battery 14 provides high voltage (HV) DC power. In one or more embodiments, the battery 14 provides HV between 150 and 400 Volts. A contactor 52 is connected in series between the battery 14 and the VVC 46. When the contactor 52 is closed, the HV DC power may be transferred from the battery 14 to the VVC 46. An input capacitor 54 is connected in parallel to the battery 14. The input capacitor 54 stabilizes the bus voltage and reduces any voltage and current ripple. The VVC 46 receives the HV DC power and boosts or "steps up" the voltage potential of the input voltage.

The inverter 48 inverts/rectifies the electrical power between AC and DC. An output capacitor 56 is connected in parallel to the VVC 46 and the inverter 48. The output capacitor 56 stabilizes bus voltage and reduces voltage and current ripple. The inverter 48 inverts the DC power supplied by the battery 14 (through the VVC 46) to AC power for operating the motor 20. The inverter 48 also rectifies AC provided by the motor 20, when acting as a generator, to DC for charging the battery 14. The inverter 48 includes a bi-directional circuit (not shown) with a series of switches oriented in a three-phase configuration in one or more embodiments. The inverter 48 includes separate circuitry for controlling each of the motor 20 and the generator 22, which is generally depicted as two inverters in FIG. 2.

Further in reference to FIG. 2, the VVC 46 includes a first switching unit 58 and a second switching unit 60 for boosting an input voltage to provide output voltage. Each switching unit 58, 60 is individually controlled by a gate drive circuit (not shown) of the VVC controller 50 and may include any type of controllable switch (e.g., an insulated gate bipolar transistor (IGBT) or field-effect transistor (FET)). The gate drive circuit provides a control signal to each switching unit 58, 60 that is based on the duty cycle command (D*).

The vehicle system includes sensors for measuring electrical parameters of the VVC 46. A first voltage sensor 62 measures the input voltage, i.e., voltage of the battery 14, and provides a corresponding input signal ($V_{bat}$) to the VVC controller 50. In one or more embodiments, the first voltage sensor 62 measures the voltage across the input capacitor 54, which corresponds to the battery voltage.

A second voltage sensor 64 measures the output voltage of the VVC 46 and provides a corresponding input signal ($V_{dc}$) to the VVC controller 50. In one or more embodiments, the second voltage sensor 64 measures the voltage across the output capacitor 56, which corresponds to the DC bus voltage.

An input inductor 66 is connected in series between the battery 14 and the switching units 58, 60. The input inductor 66 alternates between storing and releasing energy in the VVC 46 to enable the providing of the variable voltages and currents as VVC 46 output, and the achieving of the desired voltage boost. A current sensor 68 measures the input current through the input inductor 66 and provides a corresponding input signal ($I_L$) to the VVC controller 50. The input current through the input inductor 66 is a result of the voltage difference between the input and the output voltage of the VVC 46, the conducting time of the switching units 58, 60, and the inductance L of the input inductor 66.

Figure 3:
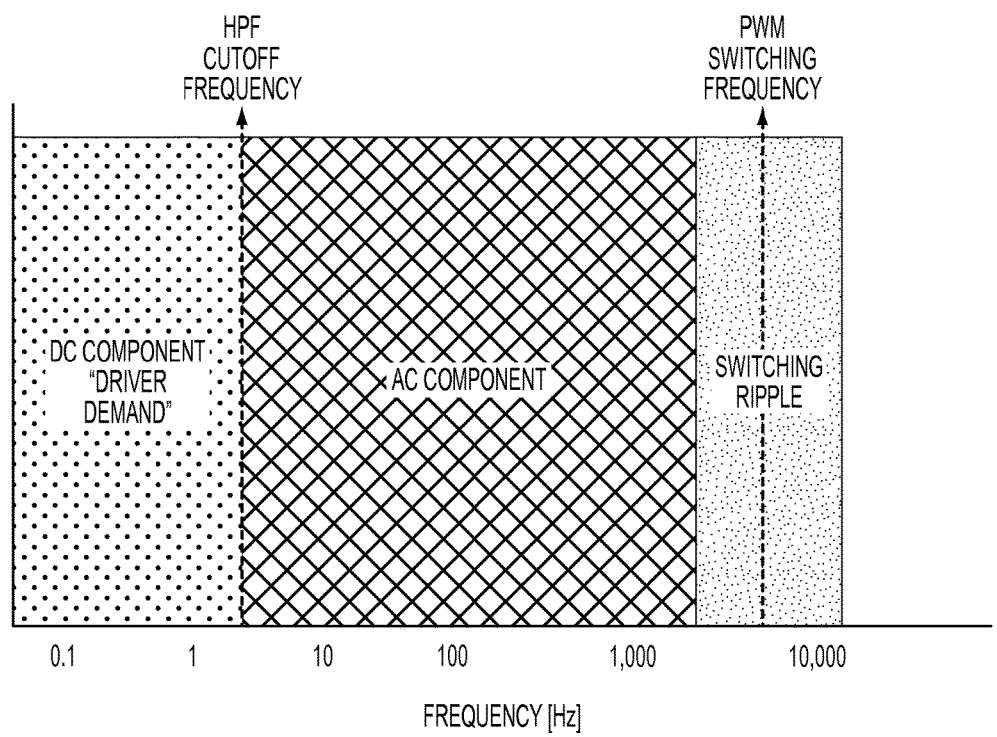
FIG. 3 is a graph illustrating a frequency spectrum of input current of an input inductor.

As shown in FIG. 3, frequency spectrum of the input current may contain one or more components. For example, a DC component is located at low range frequencies and results from driver demand inputs, such as sudden acceleration and braking events. A switching ripple is located at the highest range of the frequency spectrum and is directly related to the operation of the switching units 58, 60. An AC component is located at frequencies between just above the DC component frequencies and up to a one half of the switching frequency $F_{sw}$. The AC component is a result of signal oscillations occurring during normal operation of the motor 20 and the generator 22. It is desirable that the DC and AC components be reduced or eliminated as they may adversely affect duty cycle determination by the VVC controller 50.

The VVC controller 50 controls the output voltage of the VVC 46. The VVC controller 50 receives input from the TCM 36, VVC 46, and other controllers, and determines the duty cycle command (D*). The VVC controller 50 monitors the input signals ($V_{bat}, V_{dc}, I_L, V^*_{dc}$) to determine the duty cycle command (D*). The VVC controller 50 then provides control signals to the gate drive circuit that correspond to the duty cycle command D*. The gate drive circuit controls each switching unit 58, 60 based on the duty cycle command D*.

Figure 4:
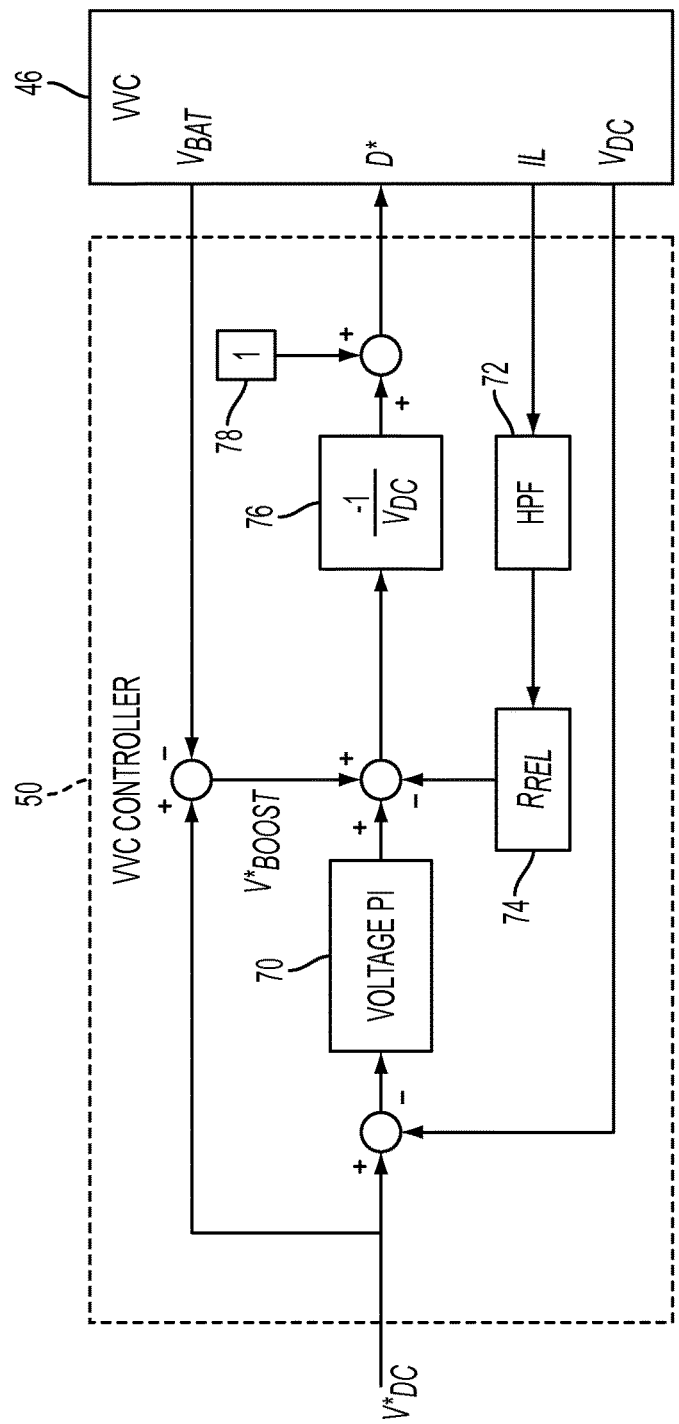
FIG. 4 is a block form diagram illustrating the hybrid vehicle voltage conversion system of FIG. 2.

With reference to FIG. 4, the VVC controller 50 determines the duty cycle command D* in response to a request from the TCM 36, i.e., output voltage command $V^*_{dc}$. The VVC controller 50 determines a boost voltage command $V^*_{boost}$, i.e., voltage boost desired at the output of the VVC 46, based on a difference between the output voltage command $V^*_{dc}$ and the battery voltage $V_{bat}$. The VVC controller 50 further determines an error between the commanded output voltage $V^*_{dc}$ and the measured output voltage by subtracting a reference voltage, e.g., output voltage $V_{dc}$ measured at the output capacitor 56, from the output voltage command $V^*_{dc}$. The error is then fed into a voltage proportional-integral (PI) controller 70 and the adjusted error at output of the voltage PI controller 70 is added to the boost voltage command $V^*_{boost}$.

The VVC controller 50 feeds the input inductor current $I_L$ through a high-pass filter (HPF) 72. The HPF 72 eliminates the undesirable DC component frequencies to ensure accurate determination of the duty cycle command D* by the VVC controller 50 and preserves the frequencies carrying the switching ripple signal. As shown for example in FIG. 3, the HPF 72 may have a cutoff frequency set such that HPF 72 will remove the DC component frequencies and pass the AC component and the switching ripple frequencies.

The output signal at the HPF 72 is multiplied by a calibrated gain 74 with units of resistance, i.e., a relative resistance gain $R_{rel}$, and the result of the multiplication is subtracted from the boost voltage command $V_{boost}^*$. Multiplication by the calibrated gain 74 may work to reduce the magnitude of the AC component of the input inductor current $I_L$ and minimize its contribution to the calculation of the duty cycle. Adjusting the boost voltage command $V_{boost}^*$ for the output voltage error and for the contribution of the AC and DC components of the input inductor current $I_L$ results in a $(1-D)V_{dc}^*$ quantity, i.e., the output voltage command $V_{dc}^*$ measured from $V_{dc}$ to a midpoint M of the switching units 58, 60. The $(1-D)V_{dc}^*$ quantity is fed into a normalization block 76. The output of the normalization block 76 is further scaled at a logic block 78 to produce the duty cycle command D*. The gate drive circuit of the VVC controller 50 controls the switching units 58, 60 based on the duty cycle command D* consistent with the methods as previously described with reference to FIG. 2.

Figure 5:
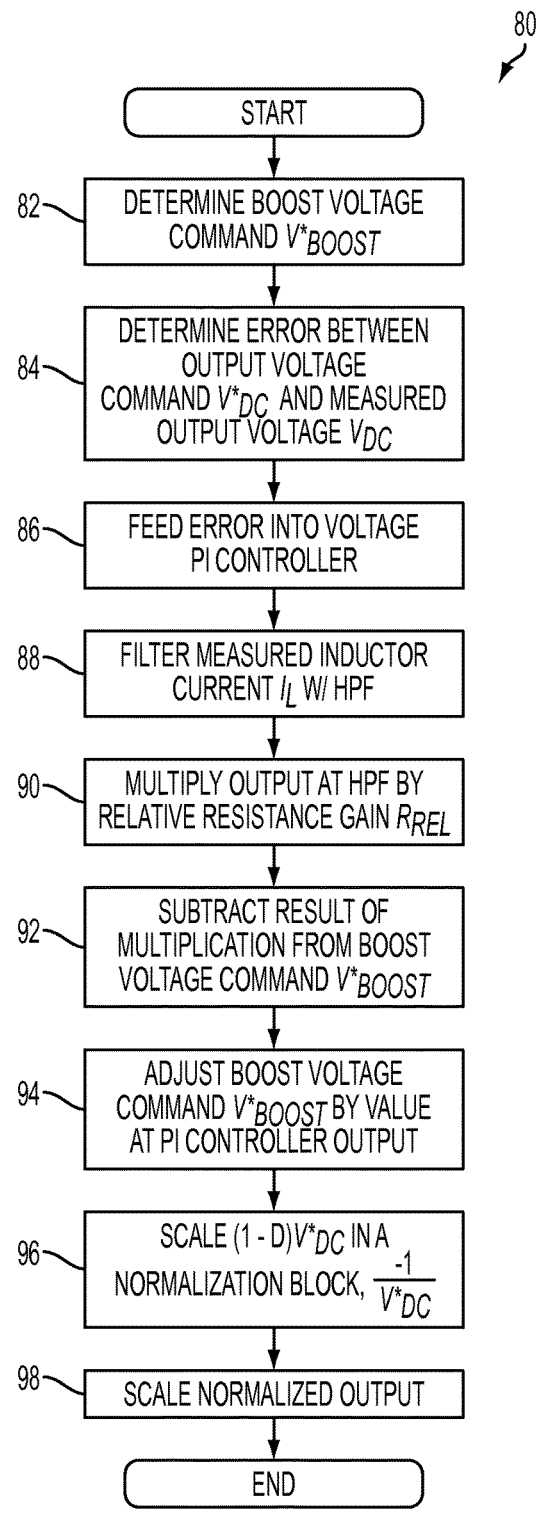
FIG. 5 is a flowchart illustrating an algorithm for determining the duty cycle for a variable voltage converter.

With reference to FIG. 5, a control strategy 80 for determining a duty cycle for a VVC 46 based on a measured inductor current is shown. The control strategy 80 may begin at block 82 with the VVC controller 50 determining the boost voltage command $V^*_{boost}$. The boost voltage command $V^*_{boost}$ may be determined by subtracting the battery voltage $V_{bat}$ from the output voltage command $V^*_{dc}$. At block 84 the VVC controller 50 determines the error between the output voltage command $V^*_{dc}$ and measured output voltage $V_{dc}$. At block 86 the VVC controller 50 feeds the determined error into the voltage PI controller 70. The VVC controller 50 feeds the measured input inductor current $I_L$ through the HPF 72 at block 88, removing the DC component frequencies. At block 90 the VVC controller 50 multiplies the signal at the output of the HPF 72 by the calibrated gain with the units of resistance, i.e., the relative resistance gain $R_{rel}$. The VVC controller 50, at block 92, adjusts the boost voltage command $V^*_{boost}$ by subtracting the output of the multiplication by the relative resistance gain $R_{rel}$. The VVC controller 50 further adjusts the boost voltage command $V^*_{boost}$ by the output at the voltage PI controller 70 and produces the $(1-D)V^*_{dc}$ quantity, i.e., the output voltage command $V^*_{dc}$ measured from $V_{dc}$ to the midpoint M of the switching units 58, 60, at block 94. At block 96 the VVC controller 50 scales the $(1-D)V^*_{dc}$ quantity in the normalization block 76. The scaled output at the normalization block 76 is scaled at the logic block 78, at block 98, producing the duty cycle command D*. At this point the control strategy 80 may end. In some embodiments the control strategy 80 described in FIG. 5 may be repeated based on a request from the TCM 36 and other controllers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle power system comprising:
    a variable voltage converter (VVC) including an inductor; and at least one controller configured to, in response to a request to alter a duty cycle of the VVC, output a duty cycle command for the VVC based on a sum of a difference between a boost voltage command and a product of an AC component of current flowing through the inductor and a calibrated gain having units of resistance and an output of a voltage PI controller receiving as an input a difference between an output voltage command and a measured output voltage of the VVC.

2. The vehicle power system of claim 1 further comprising a high-pass filter (HPF), wherein the AC component of current flowing through the inductor is output from the HPF.

3. A vehicle comprising:
    a traction battery;
    an electric machine;
    a variable voltage converter (VVC) including an inductor and disposed electrically between the traction battery and electric machine; and
    a controller programmed to issue duty cycle commands for the VVC based on a product of an AC component of current flowing through the inductor and a calibrated resistance.

4. The vehicle of claim 3, wherein the controller is further programmed to issue the duty cycle commands further based on a difference between a boost voltage command and the product.

5. The vehicle of claim 3, wherein the controller is further programmed to issue the duty cycle commands further based on a boost voltage command and an output of a voltage PI controller.

6. The vehicle of claim 5, wherein an input to the voltage PI controller is a difference between an output voltage command for the VVC and a measured output voltage of the VVC.

7. The vehicle of claim 3 further comprising a high-pass filter (HPF), wherein the AC component of current flowing through the inductor is output from the HPF.

8. A method for controlling a vehicle power system comprising:
    in response to a request to alter a duty cycle of a variable voltage converter (VVC), outputting a duty cycle command for the VVC that is based on a sum of a difference between a boost voltage command and a product of an AC component of current flowing through an inductor of the VVC and a calibrated resistance and an output of a voltage PI controller receiving as an input a difference between an output voltage command and a measured output voltage of the VVC.

9. The method of claim 8, wherein the AC component of current through the inductor is output from a high-pass filter (HPF).

* * * * *